United States Patent
Spitz et al.

(10) Patent No.: US 7,950,051 B1
(45) Date of Patent: May 24, 2011

(54) PASSWORD MANAGEMENT FOR A COMMUNICATION NETWORK

(75) Inventors: Sean T. Spitz, Olathe, KS (US); Trey A. Hilyard, Olathe, KS (US); Thomas Edward Hines, III, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1146 days.

(21) Appl. No.: 11/668,825

(22) Filed: Jan. 30, 2007

(51) Int. Cl.
*G06F 7/04* (2006.01)
*G06F 15/16* (2006.01)
*G06F 17/30* (2006.01)
*H04L 29/06* (2006.01)
*G06F 21/00* (2006.01)
*H04L 9/00* (2006.01)

(52) U.S. Cl. ............ 726/6; 713/155; 713/183; 713/186; 709/229; 380/277

(58) Field of Classification Search ................ None
See application file for complete search history.

(56) References Cited

U.S. PATENT DOCUMENTS

| | | | |
|---|---|---|---|
| 5,812,764 A * | 9/1998 | Heinz, Sr. ............. | 726/5 |
| 6,243,816 B1 * | 6/2001 | Fang et al. ............. | 726/5 |
| 2004/0240670 A1 * | 12/2004 | Man et al. ............. | 380/277 |
| 2005/0210267 A1 * | 9/2005 | Sugano et al. ............. | 713/186 |
| 2007/0124807 A1 * | 5/2007 | Jau ............. | 726/6 |

* cited by examiner

*Primary Examiner* — Shin-Hon Chen

(57) ABSTRACT

A password management system generates passwords for users. The system registers the passwords with applications in network elements in a communication network. The system indicates the passwords to the users who use the passwords to access the applications. The system generates new passwords before the old passwords expire. The system registers the new passwords with the applications and indicates the new passwords to the users before the old passwords expire. The users use the new passwords to access the applications. The system may also register network addresses with the applications for the users.

19 Claims, 5 Drawing Sheets

PASSWORD MANAGEMENT FOR A COMMUNICATION NETWORK

BACKGROUND OF THE INVENTION

1. Field of the Invention

The invention is related to the field of password access, and in particular, to password management for users that use passwords to access multiple applications in multiple network elements.

2. Description of the Prior Art

Communication networks have numerous network elements, such as switches and call processors, to provide communication services to network customers. These network elements each include multiple applications to handle routing, signaling, performance, and accounting within the communication network. Communication network operators must access these applications in the network elements to perform maintenance or some other task.

If intruders (hackers) were allowed to access the applications, they could take down the communication network or steal customer data. The applications are protected from such unauthorized access with password protection. To access an application, a network operator must first provide their user ID and password to the application.

The communication network usually has many different network elements that are provided by many different suppliers. Unfortunately, each supplier has their own password requirements. For example, the time periods before passwords automatically expire are different among different suppliers. Password registration and format are different among different suppliers. Thus, each network operator may have to manage multiple passwords to satisfy the password requirements of multiple suppliers. This situation is made worse because the network operator must repeatedly register new passwords with each network element at different times.

In a complex communication network, a user may have to track and register over one hundred different passwords on various days each month. The result of this unfortunate situation is lost time for the network operator and lost security for the communication network. The network operator may spend too much time simply registering and tracking so many passwords. The network operator may allow passwords to expire, which requires additional time to gain access to network elements. The network operator may degrade network security by using overly simple passwords or keeping improper written records of so many passwords.

SUMMARY OF THE INVENTION

Examples of the invention include a password management system and its method of operation. The password management system is for a communication network having a plurality of network elements that have a plurality of applications. The applications allow access to a plurality of users in response to passwords. The applications automatically expire the passwords after time periods. The password management system comprises a password processing system and a communication interface. The password processing system is configured to generate first ones of the passwords for the users. The password processing system is configured to generate first registration messages to register the first passwords with the applications in the network elements in the communication network. The password processing system is configured to generate first user messages to indicate the first passwords to the users, wherein the users use the first passwords to access the applications in the network elements in the communication network. The password processing system is configured to generate second ones of the passwords for the users before the first passwords expire. The password processing system is configured to generate second registration messages to register the second passwords with the applications in the network elements in the communication network before the first passwords expire. The password processing system is configured to generate second user messages to indicate the second passwords to the users before the first passwords expire, wherein the users use the second passwords to access the applications in the network elements in the communication network. The communication interface is configured to transfer the first registration messages to the applications in the network elements in the communication network. The communication interface is configured to transfer the first user messages to the users. The communication interface is configured to transfer the second registration messages to the applications in the network elements in the communication network before the first passwords expire. The communication interface is configured to transfer the second user messages to the users before the first passwords expire.

In some examples of the invention, the applications comprise software applications in mobile communication switching systems.

In some examples of the invention, a first set of the applications expire the passwords after a first one of the time periods, a second set of the applications expire the passwords after a second one of the time periods, and the first time period and the second time period are different.

In some examples of the invention, a first set of the applications is supplied by a first communication network element supplier, a second set of the applications is supplied by a second communication network element supplier, and the first communication network element supplier and the second communication network element supplier are different.

In some examples of the invention, a first set of the applications use a first registration process to register the passwords, a second set of the applications use a second registration process to register the passwords, and the first registration process and the second registration process are different.

In some examples of the invention, a first set of the applications use a first password format, a second set of the applications use a second password format, and the first password format and the second password format are different.

In some examples of the invention, the users comprise over 20 users and the applications comprise over 100 applications in over 50 of the communication network elements.

In some examples of the invention, the applications allow access to the users in response to the users using user network addresses that change over time. The password processing system is configured to generate first query messages to obtain first ones of the user network addresses. The password processing system is configured to generate first address messages to register the first user network addresses with the applications, wherein the users use the first user network addresses to access the applications. The password processing system is configured to generate second query messages to obtain second ones of the user network addresses. The password processing system is configured to generate second address messages to register the second user network addresses with the applications, wherein the users use the second user network addresses to access the applications. The communication interface is configured to transfer the first query messages, the first address messages, the second query messages, and the second address messages.

In some examples of the invention, the user network addresses comprise Internet Protocol addresses that are periodically assigned to user devices.

In some examples of the invention, the user network addresses are periodically assigned to user devices and the communication interface transfers the first query messages and the second query messages to the user devices to obtain the user network addresses.

BRIEF DESCRIPTION OF THE DRAWINGS

The same reference number represents the same element on all drawings.

DETAILED DESCRIPTION OF THE PREFERRED EMBODIMENT

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
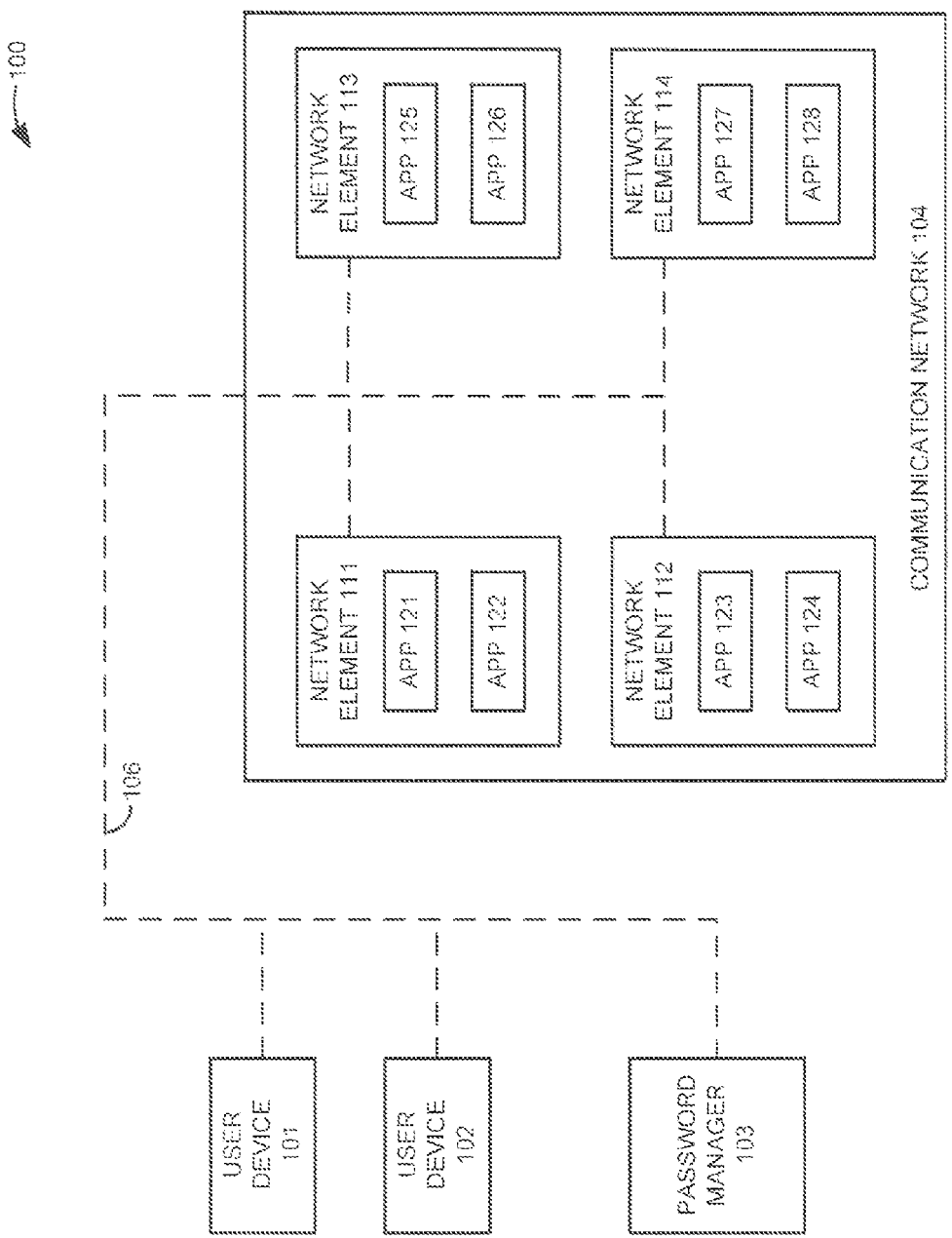
FIG. 1 illustrates a password management system for a communication network in an example of the invention.

FIG. 1 illustrates password management system 100 in an example of the invention. Password management system 100 includes user devices 101-102, password manager 103, communication network 104, and communication system 106. Communication network 104 includes communication network elements 111-114. Communication network element 111 includes applications 121-122. Communication network element 112 includes applications 123-124. Communication network element 113 includes applications 125-126. Communication network element 114 includes applications 127-128. Communication system 106 is coupled to user devices 101-102, password manager 104, and network elements 111-114.

Password management system 100 is a specific embodiment that shows a specific number and configuration of network elements and applications for illustrative purposes. Password management systems could have other numbers and configurations in other embodiments. For example, a network element could have a single application in some embodiments. There could be hundreds of users, user devices, network elements, and applications in some embodiments.

User devices 101-102 comprise computer systems, telephones, digital assistants, communication network interfaces, wireless transceivers, or some other user communication device. Password manager 103 comprises a computer system configured to operate as described herein. Network elements 111-114 could be switching systems, routers, gateways, call processors, servers, databases, management systems, or some other communication network element. Applications 121-128 could include routing tables, access control lists, media-handling software, user data, call processing software, or some other communication application. In some embodiments, network elements 111-114 are Mobile Switching Centers (MSCs), and applications 121-128 include a Signaling System Seven (SS7) application, a call routing application, and an Operations, Management, and Performance (OMP) application in each MSC. Communication system 106 comprises communication devices and links that allow user devices 101-102, password manager 103, and network elements 111-114 to communicate with one another. In some embodiments, communication system 106 comprises an Internet Protocol (IP) network.

Each user is associated with a unique user Identification (ID) and a unique password. The user may be an individual or a user group. The users operate user devices 101-102 to access applications 121-128 over communication system 106. Applications 121-128 in network elements 111-114 allow access to various users only if the users provide valid user IDs and passwords through user devices 101-102. Applications 121-128 in network elements 111-114 do not allow access to users who provide invalid user IDs or invalid passwords through user devices 101-102. Typically, access to the application allows the user to use, control, modify, and perhaps even delete the application. Applications 121-128 automatically expire (invalidate) individual passwords for individual user IDs after time periods, such as 30 days, 60 days, 90 days, or some other time increment.

Figure 2:
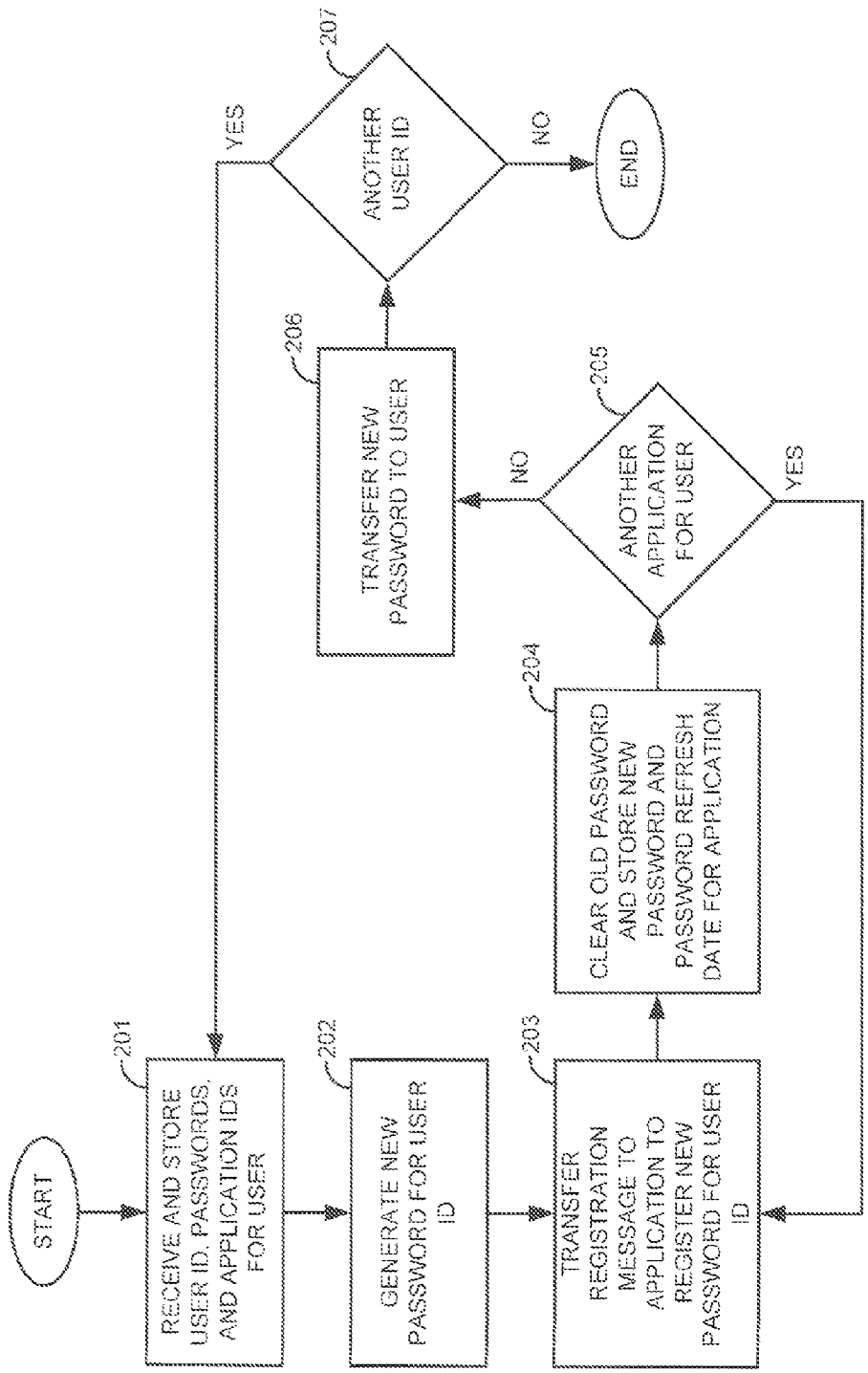
FIG. 2 illustrates the operation of a password management system in an example of the invention.

FIG. 2 illustrates the operation of password management system 100 in an example of the invention. The reference numbers from FIG. 2 are indicated parenthetically below. The following operation enters users into password management system 100, where the users already have pre-existing user IDs and passwords. Password manager 103 receives and stores a user ID, passwords, and application IDs for the user from an operator or an external system (201). The application IDs specify the applications that the user ID is allowed to access. The stored password data for all users is referred to as the user password file.

Password manager 103 generates a new password for the user ID (202). Password generation could be random or could use some other secure password generation technique. Password manager 103 generates and transfers a registration message to one of the applications for the user to register the new password for the user ID (203). Password registration could entail an interactive session between password manager 103 and the application where the information transferred from password manager 103 to the application during the session represents the registration message. Password manager 103 clears the old password from the user password file and stores the new password and password refresh date for the application (204). The password refresh date may be received from the application, operator, external system, or be determined by password manager 103. The password refresh date would be on or before the date that the application automatically expires the password. The password refresh date may be the expiration date or may be readily derived from the expiration date.

If there are more allowed applications (205) for the user ID, steps 203-204 are repeated for the other applications. If there are no more applications for the user ID (205), password manager 103 transfers the new password to the user through a user device (206). Password manager 103 could transfer the new password to the user in an email, or password manager 103 could transfer an email notice, so the user can log into manager 103 with one of their old passwords and retrieve their new password. If there are more user IDs (207), steps 201-206 are repeated for the other user IDs. If there are no more user IDs (207), the operation ends.

Figure 3:
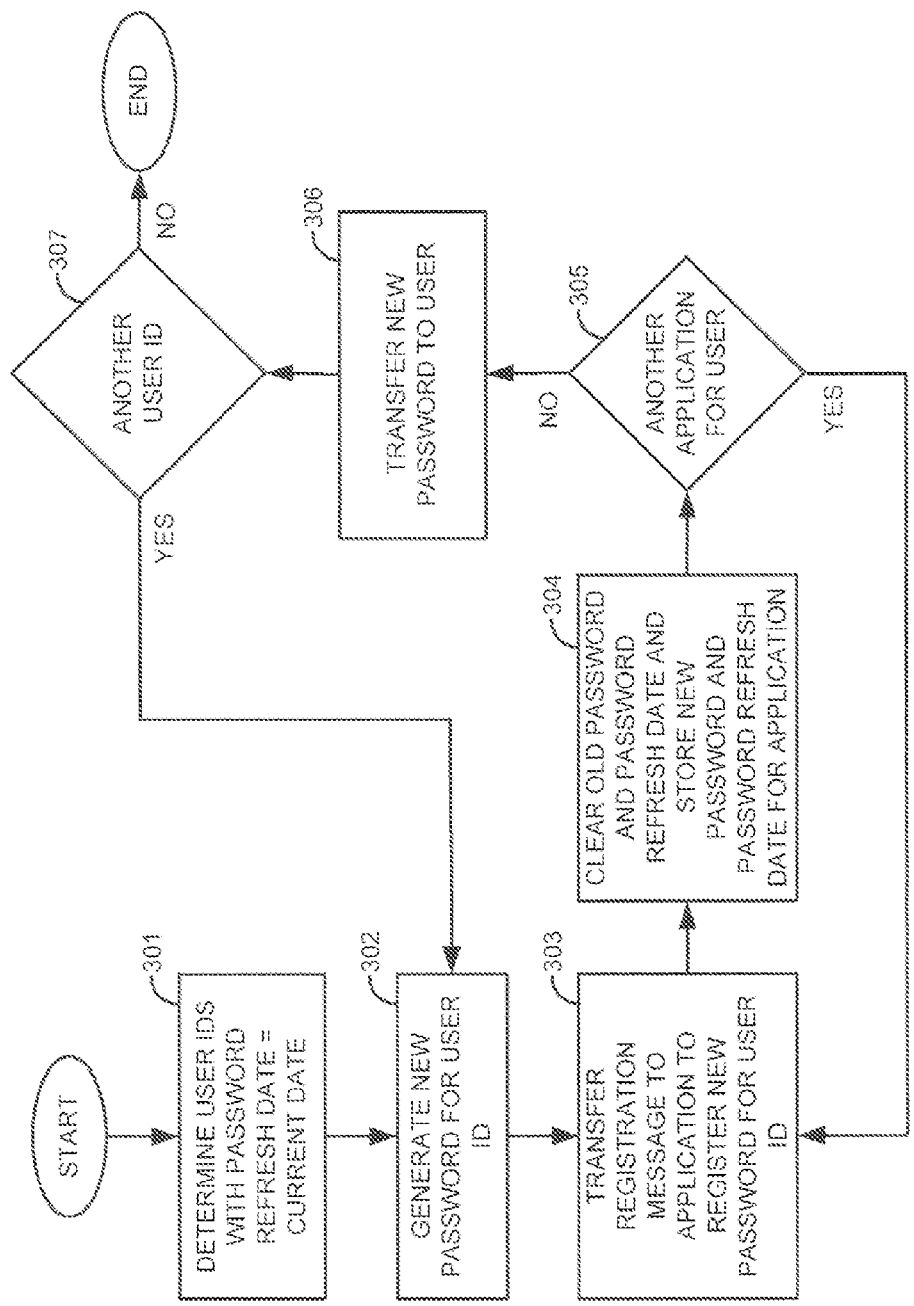
FIG. 3 illustrates the operation of a password management system in an example of the invention.

FIG. 3 illustrates the operation of password management system 100 in an example of the invention. The reference numbers from FIG. 3 are indicated parenthetically below. The following operation refreshes passwords for users that have already been entered into password management system 100. Password manager 103 determines user IDs that have a password refresh date that matches the current date (301). This could be accomplished by sorting the user password file by date, searching the user password file for the current date, or through some other date-tracking technique.

Password manager 103 generates a new password for the user ID (302). Password generation could be random or could use some other secure password generation technique. Password manager 103 generates and transfers a registration message to one of the applications for the user to register the new password for the user ID (303). Password registration could entail an interactive session between password manager 103 and the application where the information transferred from password manager 103 to the application during the session represents the registration message. Password manager 103 clears the old password and password refresh date for the application from the user password file (304). Password manager 103 stores the new password and password refresh date for the application in the user password file (304). The password refresh date may be received from the application, operator, external system, or be determined by password manager 103. The password refresh date would be on or before the date that the password expires and may be the expiration date or be derived from the expiration date.

If there are more applications for the user (305), steps 303-304 are repeated for the other applications. If there are no more applications for the user (305), password manager 103 transfers the new password to the user through a user device (306). Password manager 103 could transfer the new password to the user in an email, or password manager 103 could transfer an email notice, so the user can log into password manager 103 with their old password and retrieve their new password. If there are more user IDs (307), steps 302-306 are repeated for the other user IDs. If there are no more user IDs (307), the operation ends.

For each user, password manager 103 generates and registers a single password with multiple applications in multiple network elements, and password manager 103 transfers this password to the user. Before the password expires, password manager 103 generates and registers a new password with the applications, and password manager 103 transfers this new password to the user. Thus, the user need not bother with multiple passwords, expiration dates, and registrations. Password manager 103 provides this password service to multiple users. For example, password manager 103 could perform this password service for over 20 users and over 100 applications in over 50 communication network elements.

Applications 121-128 could be provided by various communication network element suppliers. For example, applications 121-124 could be supplied by one communication network element supplier and applications 125-128 could be supplied by a different communication network element supplier.

Different applications may expire passwords after different time periods—especially if the applications come from different suppliers. For example, applications 121-124 could expire passwords after 60 days and applications 125-128 could expire passwords after 90 days. By using password manager 103, the user has single-password access to all applications 121-128 without bothering with the different expiration time frames of different applications.

A password registration process typically requires providing a user ID, old password, and new password, but the registration process may be different for different applications—especially if the applications come from different suppliers. For example, applications 121-124 could use one password registration process that requires duplicate entry for confirmation, and applications 125-128 could use a different password registration process that omits duplicate entry. Password manager 103 could be configured to use the specific registration process for each application, so the user has single-password access to all applications 121-128 without bothering with the different registration processes of different applications.

Applications typically requires passwords with a given password format (such as the number and type of characters), but the password format may be different for different applications—especially if the applications come from different suppliers. For example, applications 121-124 could use one password format that requires at least four characters, and applications 125-128 could use a different password format that requires at least six characters. Password manager 103 could be configured to use a password format that satisfies all applications, so the user has single-password access to all applications 121-128 without bothering with the different password formats of different applications.

Password management system 100 could be used terminate a password for an application by placing a password termination date in the user password file in place of the password refresh date. In response to the password termination date, password manager 103 interacts with the application to terminate the password.

Password management system 100 could be used provide a temporary password by generating and registering a password, providing the password to the user, and placing a password termination date in the password file instead of a password refresh date. In response to the password termination date, password manager 103 interacts with the application to terminate the password.

Password management system 100 could be used to temporarily lock-out all users from an application by changing the current passwords of all users of the application without providing the new password to these users during the lock-out period. After the lock-out period, password manager 103 would transfer the new passwords to the users.

The following discussion describes another layer of security that can be provided by password management system 100. Referring to FIG. 1, user devices 101-102 each obtain a network address from communication system 106. For example, user device 101 might obtain an IP address from a host server in communication system 106 and use the IP address to send and receive IP messages over communication system 106. Periodically, user devices 101-102 each obtain a new network address from communication system 106. For example, user device 101 might obtain a new IP address from the host server each time it boots up.

If desired, applications 121-128 can be configured with an additional layer of security by configuring them to allow access only to a user who operates a user device with a valid network address that has been pre-registered with their user ID and password. Thus, applications 121-128 would be configured to provide the user with access only if they provide a valid user ID and a valid password from a user device that has a valid network address. For example, user device 101 might have a network address of 111.222.333.444. The user of user device 101 might have a user ID of Victor Smith and a password of Q2W3E4. Application 121 would provide the user with access if they provide the user ID Victor Smith and the password of Q2W3E4 from a user device having a network address of 111.222.333.444. Application 121 would deny access to the user even if they provide the user ID of Victor Smith and the password of Q2W3E4, but if their user device has a different network address. Applications 121-128 would allow password manager 103 to register new network addresses for users in a similar manner to registering new passwords.

Figure 4:
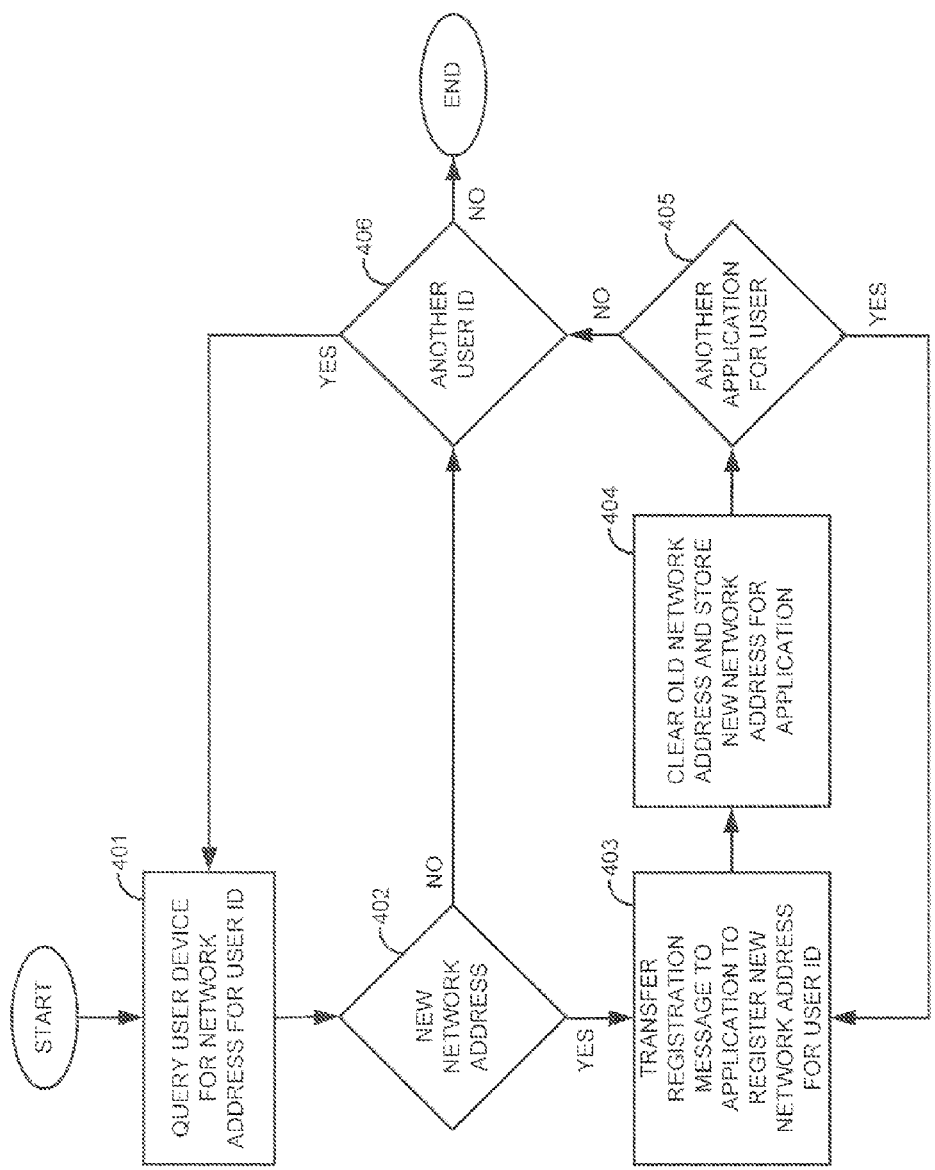
FIG. 4 illustrates the operation of a password management system in an example of the invention.

FIG. 4 illustrates the operation of password management system 100 in an example of the invention. The reference numbers from FIG. 4 are indicated parenthetically below. The following operation supports the additional layer of security using network addresses. Password manager 103 queries a user device for its current network address for a user ID (401). The queries occur periodically, such as daily. Password manager 103 compares the network address from the user device to the network address for the user ID in the user password file. If the network address from the user device is not new (402)—the same network address is in the user password file—then the operation proceeds to step 406 to process another user ID. If the network address from the user device is new (402)—no network address in the user password file or a different network address in the user password file—then password manager 103 transfers a registration message to an application for the user to register the new network address for the user ID (403). The user may then access the application from the new network address (with a valid user ID and password) but not from other network addresses. Password manager 103 clears the old network address and stores the new network address for the user ID and application in the user password file (404). If there are other applications for the user (405), then password manager 103 repeats steps 403-404 for the other applications. If there are no other applications for the user (405), then the operation proceeds to step 406. If there are other user IDs (406), password manager 103 repeats steps 401-405 for the other user IDs. If there are no other user IDs (406), then the operation ends.

Figure 5:
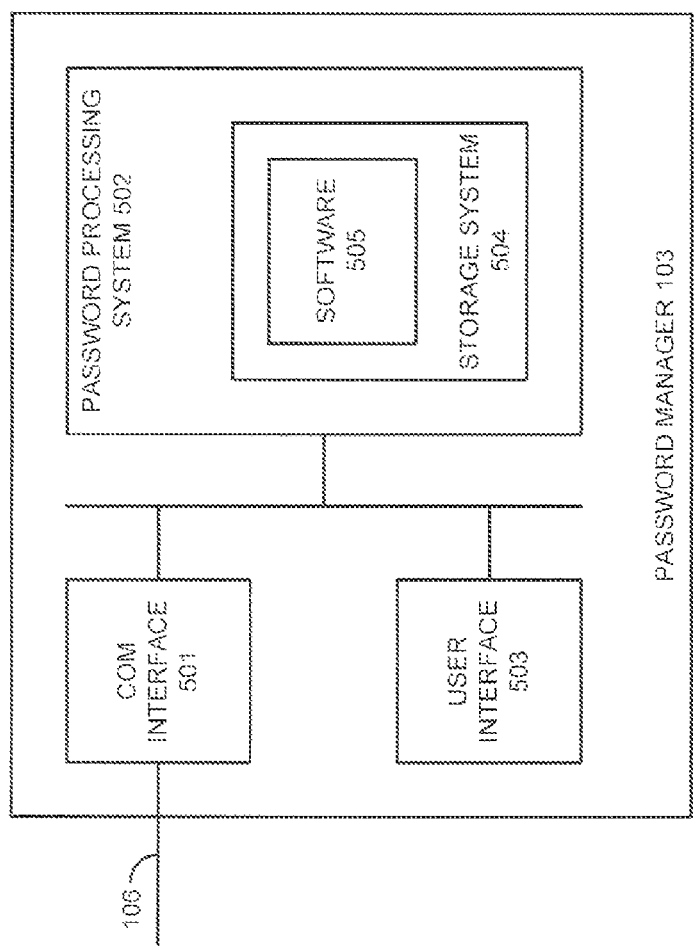
FIG. 5 illustrates a password manager in an example of the invention.

FIG. 5 illustrates password manager 103 in an example of the invention. Password manager 103 includes communication interface 501, password processing system 502, and user interface 503. Password processing system 502 includes storage system 504. Storage system 504 stores software 505. Password processing system 502 is linked to communication interface 501 and user interface 503. Password manager 103 could be comprised of a programmed general-purpose computer system, although those skilled in the art will appreciate that programmable or special purpose circuitry and equipment may be used. Password manager 103 may use a distributed architecture where operations are distributed among devices that together comprise elements 501-505.

Communication interface 501 could comprise a network interface card, wireless transceiver, modem, port, or some other communication device. Communication interface 501 may be distributed among multiple communication devices. Processing system 502 could comprise a computer microprocessor, logic circuit, or some other processing device. Processing system 502 may be distributed among multiple processing devices. User interface 503 could comprise a keyboard, mouse, voice recognition interface, microphone and speakers, graphical display, touch screen, or some other type of user device. User interface 503 may be distributed among multiple user devices. Storage system 504 could comprise a disk, tape, integrated circuit, server, or some other memory device. Storage system 504 may be distributed among multiple memory devices.

Password processing system 502 retrieves and executes software 505 from storage system 504. Software 505 may comprise an operating system, utilities, drivers, networking software, and other software typically loaded onto a general-purpose computer. Software 505 could comprise a program, firmware, or some other form of machine-readable processing instructions. When executed by password processing system 502, software 505 directs password processing system 502 to operate password manager 103 as described herein.

Password processing system 501 generates and transfer messages to communication interface 502, and communication interface 501 transfers these messages over communication system 106. Communication interface 501 receives messages over communication system 106 and transfers the messages to password processing system 502 for processing.

The invention claimed is:

1. A password management system for a communication network having a plurality of network elements having a plurality of applications wherein the applications allow access to a plurality of users in response to passwords and wherein the applications automatically expire the passwords after time periods, the password management system comprising:
   a password processing system configured to generate first ones of the passwords for the users, generate first registration messages to register the first passwords with the applications in the network elements in the communication network, generate first user messages to indicate the first passwords to the users, wherein the users use the first passwords to access the applications in the network elements in the communication network, generate second ones of the passwords for the users before the first passwords expire, generate second registration messages to register the second passwords with the applications in the network elements in the communication network before the first passwords expire, generate second user messages to indicate the second passwords to the users before the first passwords expire, wherein the users use the second passwords to access the applications in the network elements in the communication network;
   a communication interface configured to transfer the first registration messages to the applications in the network elements in the communication network, transfer the first user messages to the users, transfer the second registration messages to the applications in the network elements in the communication network before the first passwords expire, and transfer the second user messages to the users before the first passwords expire; and
   wherein a first set of the applications use a first registration process to register the passwords, wherein a second set of the applications use a second registration process to register the passwords, and wherein the first registration process and the second registration process are different.

2. The password management system of claim 1 wherein the applications comprise software applications in mobile communication switching systems.

3. The password management system of claim 1 wherein a first set of the applications expire the passwords after a first one of the time periods, wherein a second set of the applications expire the passwords after a second one of the time periods, and wherein the first time period and the second time period are different.

4. The password management system of claim 1 wherein a first set of the applications is supplied by a first communication network element supplier, wherein a second set of the applications is supplied by a second communication network element supplier, and wherein the first communication network element supplier and the second communication network element supplier are different.

5. The password management system of claim 1 wherein a first set of the applications use a first password format, wherein a second set of the applications use a second password format, and wherein the first password format and the second password format are different.

6. The password management system of claim 1 wherein the users comprise over 20 users and the applications comprise over 100 applications in over 50 of the communication network elements.

7. The password management system of claim 1 wherein the applications allow access to the users in response to the users using user network addresses that change over time:
the password processing system is configured to generate first query messages to obtain first ones of the user network addresses, generate first address messages to register the first user network addresses with the applications, wherein the users use the first user network addresses to access the applications, generate second query messages to obtain second ones of the user network addresses, generate second address messages to register the second user network addresses with the applications, wherein the users use the second user network addresses to access the applications; and
the communication interface is configured to transfer the first query messages, the first address messages, the second query messages, and the second address messages.

8. The password management system of claim 7 wherein the user network addresses comprise Internet Protocol addresses that are periodically assigned to user devices.

9. The password management system of claim 7 wherein the user network addresses are periodically assigned to user devices and the communication interface transfers the first query messages and the second query messages to the user devices to obtain the user network addresses.

10. A password management system for a communication network having a plurality of network elements having a plurality of applications wherein the applications allow access to a plurality of users in response to passwords, wherein the applications automatically expire the passwords after time periods, and wherein the applications allow access to the users in response to the users using user network addresses that change over time, the password management system comprising:
a password processing system configured to generate first ones of the passwords for the users, generate first registration messages to register the first passwords with the applications in the network elements in the communication network, generate first user messages to indicate the first passwords to the users, wherein the users use the first passwords to access the applications in the network elements in the communication network, generate second ones of the passwords for the users before the first passwords expire, generate second registration messages to register the second passwords with the applications in the network elements in the communication network before the first passwords expire, generate second user messages to indicate the second passwords to the users before the first passwords expire, wherein the users use the second passwords to access the applications in the network elements in the communication network; and a communication interface configured to transfer the first registration messages to the applications in the network elements in the communication network, transfer the first user messages to the users, transfer the second registration messages to the applications in the network elements in the communication network before the first passwords expire, and transfer the second user messages to the users before the first passwords expire;
the password processing system is further configured to generate first query messages to obtain first ones of the user network addresses, generate first address messages to register the first user network addresses with the applications, wherein the users use the first user network addresses to access the applications, generate second query messages to obtain second ones of the user network addresses, generate second address messages to register the second user network addresses with the applications, wherein the users use the second user network addresses to access the applications; and
the communication interface is further configured to transfer the first query messages, the first address messages, the second query messages, and the second address messages.

11. The password management system of claim 10 wherein the applications comprise software applications in mobile communication switching systems.

12. The password management system of claim 10 wherein a first set of the applications expire the passwords after a first one of the time periods, wherein a second set of the applications expire the passwords after a second one of the time periods, and wherein the first time period and the second time period are different.

13. The password management system of claim 10 wherein a first set of the applications is supplied by a first communication network element supplier, wherein a second set of the applications is supplied by a second communication network element supplier, and wherein the first communication network element supplier and the second communication network element supplier are different.

14. The password management system of claim 10 wherein a first set of the applications use a first registration process to register the passwords, wherein a second set of the applications use a second registration process to register the passwords, and wherein the first registration process and the second registration process are different.

15. The password management system of claim 10 wherein a first set of the applications use a first password format, wherein a second set of the applications use a second password format, and wherein the first password format and the second password format are different.

16. The password management system of claim 10 wherein the users comprise over 20 users and the applications comprise over 100 applications in over 50 of the communication network elements.

17. The password management system of claim 10 wherein the user network addresses comprise Internet Protocol addresses that are periodically assigned to user devices.

18. The password management system of claim 10 wherein the user network addresses are periodically assigned to user devices and the communication interface transfers the first query messages and the second query messages to the user devices to obtain the user network addresses.

19. A method of operating a password manager for a communication network having a plurality of network elements having a plurality of applications wherein the applications allow access to a plurality of users in response to passwords, wherein the applications automatically expire the passwords after time periods, and wherein the applications allow access to the users in response to the users using user network addresses that change over time, the method comprising:

generating first ones of the passwords for the users;

generating and transferring first registration messages to register the first passwords with the applications in the network elements in the communication network;

generating and transferring first user messages to indicate the first passwords to the users, wherein the users use the first passwords to access the applications in the network elements in the communication network;

generating second ones of the passwords for the users before the first passwords expire;

generating and transferring second registration messages to register the second passwords with the applications in the network elements in the communication network before the first passwords expire;

generating and transferring second user messages to indicate the second passwords to the users before the first passwords expire, wherein the users use the second passwords to access the applications in the network elements in the communication network;

generating and transferring first query messages to obtain first ones of the user network addresses;

generating and transferring first address messages to register the first user network addresses with the applications, wherein the users use the first user network addresses to access the applications;

generating and transferring second query messages to obtain second ones of the user network addresses;

generating and transferring second address messages to register the second user network addresses with the applications, wherein the users use the second user network addresses to access the applications.

* * * * *